Dec. 2, 1958     R. P. LEWIS     2,862,458
RAIL CAR AXLE DRIVE
Filed March 31, 1955     2 Sheets-Sheet 1
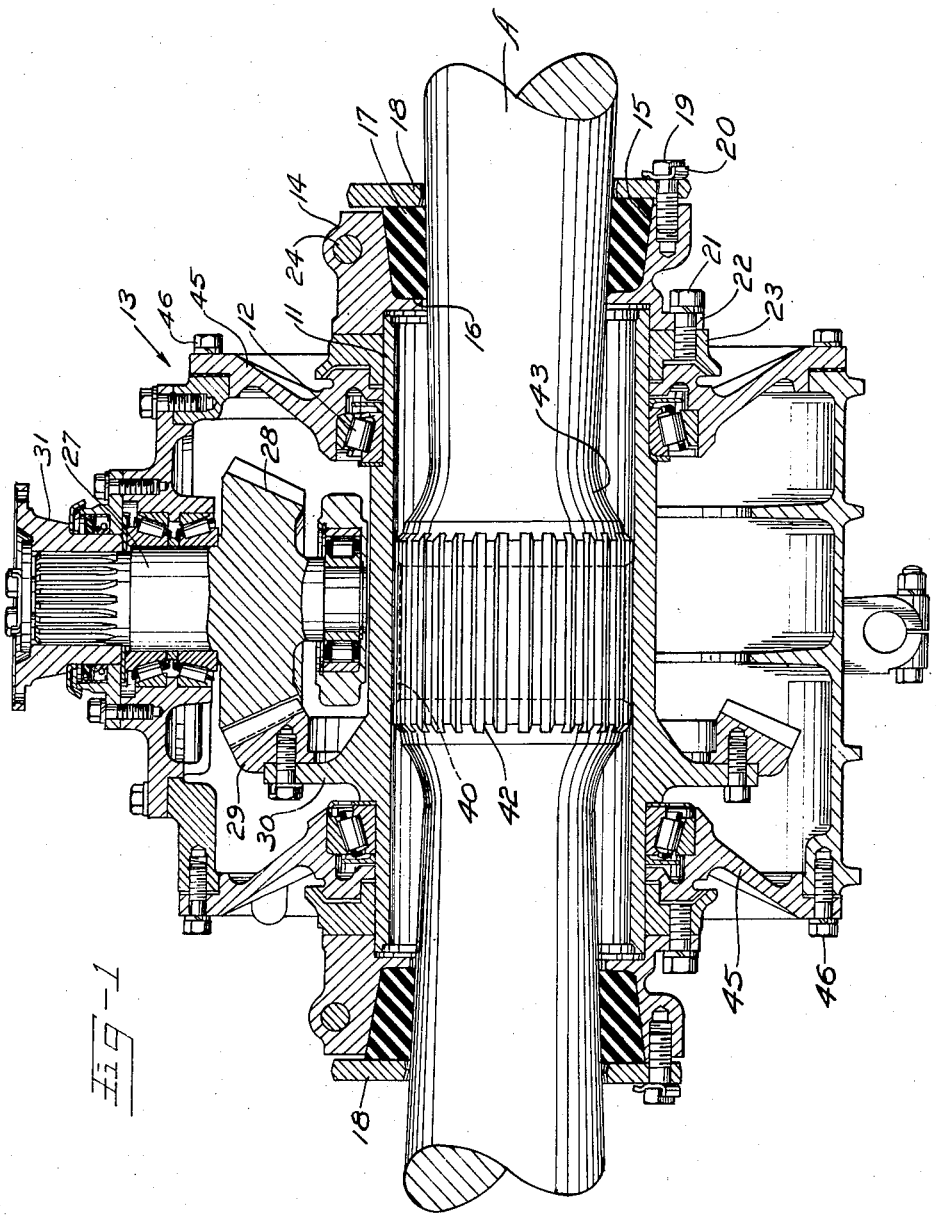
INVENTOR.
ROBERT P. LEWIS
BY
Lawrence C. Witker
ATTY.

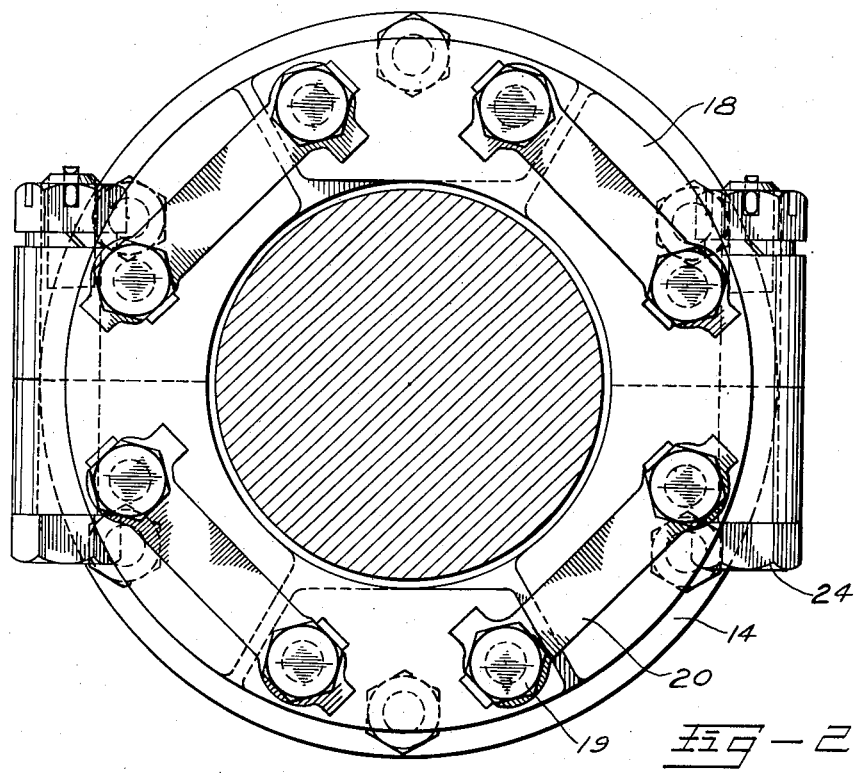
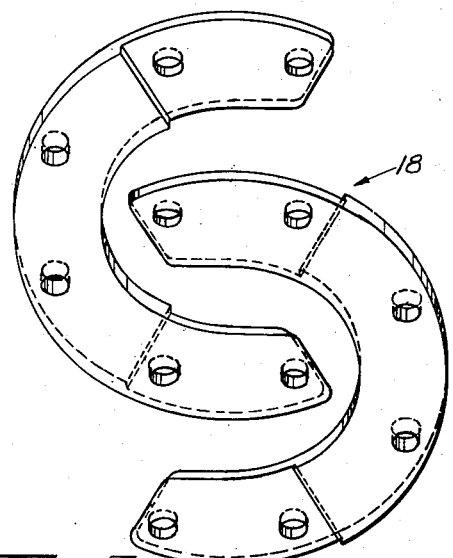

2,862,458
RAIL CAR AXLE DRIVE

Robert P. Lewis, Toledo, Ohio, assignor to Dana Corporation, Toledo, Ohio, a corporation of Virginia Application March 31, 1955, Serial No. 498,313

3 Claims. (Cl. 105—131)

This invention relates to axle drive mechanisms of the type wherein a gear casing surrounds a rail car axle and contains gearing through which drive is imparted to the axle, the gearing being driven from a propeller shaft, or the like, connected to a suitable prime mover.

An object of the invention is to provide a positive and cushioned drive connection between a pair of generally concentric surfaces, such, for example, as a shaft and a surrounding sleeve, such means being quickly assembled to establish a driving connection between the outer member or sleeve and an inner member or shaft of generally standard size, and wherein the parts are so related that they can be easily placed in position and subsequently removed if necessary, due to the use of a splined positive drive connection and a pair of spaced rubber bushings at the ends of the sleeve having clamping or confining means associated therewith to thicken or expand the bushings into engagement between the sleeve and shaft. The resilient or cushioning members serve to yieldingly couple the adjacent elements together to permit limited relative movement and to absorb shocks and vibrations resulting from operation thereof.

Further objects and advantages will become apparent from a study of the following description when considered in connection with the accompanying drawings, in which:

Figure 1 is a longitudinal sectional view of a drive embodying a preferred form of the invention.

Figure 2 is an enlarged end view of the clamping mechanism, with the axle shown in section.

Figure 3 is an isometric view of the sections of one of the clamping means.

This mechanism consists, generally, of a driving sleeve, or quill, splined on the axle between the wheels thereof, and placeable on the axle when one of the wheels is removed, a gear box in which the sleeve is journalled, clutch rings of compressible resilient material, as rubber, located beyond opposite ends of the sleeve, in contradistinction to within the sleeve, and carried in internal annular recesses in collars located beyond opposite ends of the sleeve and connected to the sleeve to rotate therewith, and clamping rings opposed to the ends of the collars and operable to press endwise against the outer ends of the clutch rings to compress them radially and thus clutch the clutch rings, and resiliently connect the sleeve or quill to the axle. The mechanism further includes a gear box having bearings in which the sleeve is journalled, an input shaft in the gear box and gearing between the sleeve and the input shaft.

11 designates the driving sleeve or quill journalled in bearings, as antifriction bearings 12 in the gear box 13. Collars 14 located beyond opposite ends of the sleeve are secured thereto to rotate therewith, the collars having internal recesses 15 around the axle A and opening through the outer ends of the collars, the inner circumferential walls of the recesses tapering inwardly from the outer ends of the collars toward the periphery of the axle. Also, the recesses have inner radial walls 16.

To resiliently couple the driving mechanism to axle A, clutch rings 17 of resilient compressible material, as rubber are fitted into the recesses 15 and thrusting at their inner ends against the radial walls 16. These clutch rings extending beyond the outer ends of the collars 14 and are compressed into the recesses and radially against the periphery of the axle 11 by suitable clamping members, as rings 18. These rings are formed of arcuate sections and the ends of the arcuate sections lap or are spliced over onto each other. The rings 18 are clamped toward the collar 14 by clamping screws 19, which are usually held from turning by suitable lock devices 20. The collars 14 are secured to the ends of the sleeve, as by bolts 21 extending through opposing flanges 22 and 23 on the collars and on the ends of the sleeve, the flanges 23 being provided on collars, which are in turn shrunk or otherwise secured on the ends of the sleeve. The collars 14 are split and are shown in Fig. 2 as formed in two half sections, which are clamped together onto the clutch rings 17 by tangentially extending bolts 24.

Suitable motion transmitting means is located in the gear box, that here shown including a radially extending input shaft 27 journalled in the gear box and having a gear 28 at its inner end meshing with the ring gear 29 secured to the flange 30 which is preferably integral with the sleeve. The outer end of the input shaft 27 is provided with a section 31 of a universal joint connected to a complemental joint on a propeller shaft, which in turn is connected through a universal joint to a driven section which transmits the driving motion from any suitable prime mover.

To positively couple the driving mechanism to axle A, a central portion of the quill 11 is provided with splines 40 interfitting with splines 42 in the axle A. Thus, a rigid drive is provided between the quill and axle in addition to the resilient drive provided by the rings 17 which also serve to locate the casing 13 longitudinally of the axle with splines 40 and 42 in proper driving relation. If desired, the axle A may be enlarged as at 43 and this enlargement provided with the splines 42.

To gain access to the casing and parts therein, the casing is formed with removable end walls 45 held to the body of the casing, as by screws 46.

By providing a sub-assembly of the resilient clutch ring, the collar for holding the clutch ring and the clamping ring, these clutch rings are readily and easily assembled onto the sleeve and also readily removed and repaired. Likewise, ready access to the interior of the casing has been provided, and by means of the splined drive connection the entire unit is easily assembled on and disassembled from the axle.

Further, because of their shock absorbing action, the rubber rings 17 reduce, and frequently prevent, vibration between the splines 40, 42. This vibration dampening greatly reduces fretting corrosion, with the result that the lift of the unit is materially increased.

What I claim is:

1. In combination with a rotatable axle, a drive unit including a rigid sleeve surrounding said axle in spaced relation thereto, a splined connection between said sleeve and said axle to provide a positive drive therebetween, and means for establishing a flexible connection between said sleeve and said axle, said means including a pair of axially spaced rubber bushings located outwardly of the ends of said sleeve, means including longitudinally split clamping members secured to the ends of said sleeve for confining said bushings substantially concentrically of said axle, and means for longitudinally compressing said bushings to thicken the latter into gripping engagement with said axle to locate the unit longitudinally of the axle.

2. In combination with a rotatable axle, a drive unit including a quill surrounding and having a splined driving connection with said axle, and means for establishing a resilient connection between said quill and said axle comprising a split collar at each end of said quill and secured thereto, a resilient bushing in each of said collars, and means for longitudinally compressing said bushings to radially thicken the latter into gripping engagement with said collars and said axle to dampen said splined driving connection between said quill and axle.

3. In an axle drive, a sleeve mountable on an axle having a driving connection therewith and having shoulders at its opposite ends, collars thrusting against said shoulders rotatable therewith and formed with internal annular recesses, rings of compressible resilient material in said recesses located beyond the ends of the sleeve to press radially against the axle and means carried by the collars for clamping the rings axially into the recesses, a gear box in which the sleeve is journalled, an input shaft journalled in the gear box and gearing between the sleeve and the input shaft.

References Cited in the file of this patent

UNITED STATES PATENTS

| | | |
|---|---|---|
| 1,980,664 | Burrows et al. | Nov. 13, 1934 |
| 2,026,076 | Spicer | Dec. 31, 1935 |
| 2,164,487 | Beckjord | July 4, 1939 |